UNITED STATES PATENT OFFICE.

GEORGE W. BAILEY, OF NEW YORK, N. Y.

COMPOSITION OF MATTER.

SPECIFICATION forming part of Letters Patent No. 639,495, dated December 19, 1899.

Application filed April 28, 1898. Serial No. 679,093. (No specimens.)

*To all whom it may concern:*

Be it known that I, GEORGE W. BAILEY, a citizen of the United States, residing in the city of New York, (Brooklyn,) in the county of Kings and State of New York, have invented a new and useful Composition of Matter to be Used for Paint, of which the following is a specification.

My composition consists of the following ingredients, combined in the proportions stated, viz: any copal gum, one hundred and twenty-five pounds; linseed-oil, twelve gallons; caustic soda, fifteen pounds; chlorid of manganese to suit; spirits of turpentine, twenty gallons; carbonate of lead, twelve hundred pounds; powdered flint, (as, for example, silex,) four hundred pounds. These ingredients when mixed produce a product of approximately one hundred and ten gallons or about two thousand pounds.

The manner of uniting the ingredients and producing the paint is as follows: The gum is placed in a suitable kettle and located over a fire that is sufficient to melt it to a liquid condition. The oil is then added and mixed with the melted gum by stirring. The chlorid of manganese is then added to the oil and gum to make a solid mass. I am unable to give the exact amount of manganese to be added, as the qualities of the gum and oil vary. With some mixtures of oil and gum a more or less quantity of the chlorid of manganese would have to be added to produce a solid mass. The chlorid of manganese is added a little at a time until the mass becomes solid. The solid mass is then reduced to a solution with the spirits of turpentine, and to the solution is added the carbonate of lead and the powdered flint—as, for example, silex. The whole mass is then ground, preferably, with a drying-oil. The resulting paint is waterproof. It is adapted for use more particularly on metal, as it prevents corrosion of the metal.

What I claim as my invention, and desire to secure by Letters Patent of the United States, is—

1. The herein-described composition of matter, consisting of any copal gum, linseed-oil, caustic soda, chlorid of manganese, spirits of turpentine, carbonate of lead, and powdered flint, substantially as described and for the purpose specified.

2. The herein-described composition of matter for forming a waterproof paint consisting of any copal gum one hundred and twenty-five pounds, linseed-oil twelve gallons, caustic soda fifteen pounds, chlorid of manganese to suit, spirits of turpentine twenty gallons, carbonate of lead twelve hundred pounds, powdered flint four hundred pounds, substantially as described.

In testimony whereof I have signed my name to this specification in the presence of two subscribing witnesses.

GEORGE W. BAILEY.

Witnesses:
KATHERINE G. LE ARD,
GEO. E. CRUSE.